(12) United States Patent  (10) Patent No.: US 8,505,282 B2
Gonze et al.  (45) Date of Patent: Aug. 13, 2013

(54) SELECTIVE CATALYTIC REDUCTION (SCR) DEVICE CONTROL SYSTEM

(75) Inventors: Eugene V. Gonze, Pinckney, MI (US); Michael J. Paratore, Jr., Howell, MI (US); Chang H. Kim, Rochester, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 13/228,932

(22) Filed: Sep. 9, 2011

(65) Prior Publication Data

US 2013/0061576 A1  Mar. 14, 2013

(51) Int. Cl.
 *F01N 3/00* (2006.01)
(52) U.S. Cl.
 USPC ............... 60/286; 60/295; 60/299; 60/300
(58) Field of Classification Search
 USPC .................................. 60/274–324
 See application file for complete search history.

(56) References Cited

U.S. PATENT DOCUMENTS

| 5,417,062 | A  * | 5/1995  | Swars et al. ............... 60/300 |
| 2008/0223019 | A1 * | 9/2008  | Gonze et al. ............... 60/286 |
| 2008/0282686 | A1 * | 11/2008 | Gonze et al. ............... 60/300 |
| 2010/0115921 | A1 * | 5/2010  | Gonze et al. ............... 60/285 |
| 2011/0000194 | A1 * | 1/2011  | Gonze et al. ............... 60/286 |
| 2011/0192143 | A1 * | 8/2011  | Andersson et al. ......... 60/274 |
| 2012/0023909 | A1 * | 2/2012  | Lambert et al. ............ 60/274 |
| 2012/0060471 | A1 * | 3/2012  | Gonze et al. ............... 60/274 |

* cited by examiner

*Primary Examiner* — Thomas Denion
*Assistant Examiner* — Jesse Bogue
(74) *Attorney, Agent, or Firm* — Cantor Colburn LLP

(57) ABSTRACT

An exhaust gas treatment system for an internal combustion engine is provided, including an exhaust gas conduit, an oxidation catalyst ("OC") device, an electrically heated catalyst ("EHC") device, a selective catalytic reduction ("SCR") device, and a control module. The OC device is in fluid communication with the exhaust gas conduit. The OC device adsorbs hydrocarbons and is selectively activated to induce oxidation of the hydrocarbons in the exhaust gas. The EHC device is in fluid communication with the exhaust gas conduit and is configured to receive the exhaust gas. The EHC device is located within the OC device and is selectively activated to produce heat and induce further oxidation of the exhaust gas. The EHC device has an oxidation catalyst compound disposed thereon for converting nitrogen oxide ("NO") to nitrogen dioxide ("$NO_2$").

20 Claims, 2 Drawing Sheets

SELECTIVE CATALYTIC REDUCTION (SCR) DEVICE CONTROL SYSTEM

FIELD OF THE INVENTION

Exemplary embodiments of the invention relate to exhaust gas treatment systems for internal combustion engines and, more particularly, to an exhaust gas treatment system having an electrically heated catalyst ("EHC") that is selectively activated to heat a selective catalytic reduction ("SCR") device.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. The catalyst compound of the OC induces an oxidation reaction of the exhaust gases once the OC device has attained a threshold or light-off temperature. One type of exhaust treatment technology for reducing $NO_x$ emissions is a selective catalytic reduction ("SCR") device that may be positioned downstream of the OC device. The SCR device includes a substrate, having a SCR catalyst compound applied to the substrate. A reductant is typically sprayed into hot exhaust gases upstream of the SCR device. The reductant may be a urea solution that decomposes to ammonia ("$NH_3$") in the hot exhaust gases and is absorbed by the SCR device. The ammonia then reduces the $NO_x$ to nitrogen in the presence of the SCR catalyst. However, the SCR device also needs to reach a threshold or light-off temperature to effectively reduce $NO_x$. During a cold start of the engine, the OC and the SCR devices have not attained the respective light-off temperatures, and therefore generally may not effectively remove CO, HC, and $NO_x$ from the exhaust gases.

One approach for increasing the effectiveness of the OC and the SCR devices involves having the engine operate at a higher temperature, which in turn also raises the temperature of the exhaust gases. However, this approach involves the engine operating at a lower level of efficiency to create the hotter exhaust gas, which results in greater fuel consumption. Accordingly, it is desirable to provide an efficient approach to increasing the temperature of the exhaust gases upstream of the OC and the SCR devices.

SUMMARY OF THE INVENTION

In one exemplary embodiment of the invention, an exhaust gas treatment system for an internal combustion engine is provided, including an exhaust gas conduit, an oxidation catalyst ("OC") device, an electrically heated catalyst ("EHC") device, a selective catalytic reduction ("SCR") device, and a control module. The exhaust gas conduit is in fluid communication with, and is configured to receive an exhaust gas from the internal combustion engine. The exhaust gas contains oxides of nitrogen ("$NO_x = NO + NO_2$"), carbon monoxide, and hydrocarbons. The OC device is in fluid communication with the exhaust gas conduit. The OC device includes a front face. The OC device adsorbs hydrocarbons and is selectively activated to induce oxidation of the hydrocarbons in the exhaust gas. The EHC device is in fluid communication with the exhaust gas conduit and is configured to receive the exhaust gas. The EHC device is located within the OC device and is selectively activated to produce heat and induce further oxidation of the exhaust gas. The EHC device has an oxidation catalyst compound disposed thereon for converting nitrogen oxide ("NO") to nitrogen dioxide ("$NO_2$"). The EHC device is positioned downstream of the front face of the OC device such that hydrocarbons in the exhaust gas do not substantially interfere with the generation of $NO_2$ by the EHC device. The SCR device is in fluid communication with the exhaust gas conduit and is configured to receive the exhaust gas. The SCR device is located downstream of the EHC device and the OC device. The SCR device is in communication with and receives and stores reductant from a reductant source. The control module is in communication with the EHC device and the internal combustion engine. The control module includes a control logic for determining if the SCR device has a threshold value of reductant stored therein. The threshold value of reductant is the amount of reductant needed to create a chemical reaction to convert the reductant and the oxides of nitrogen $NO_x$ in the exhaust gas into intermediates. The control module also includes a control logic for activating the reductant source if the SCR device has not stored the threshold value of reductant.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
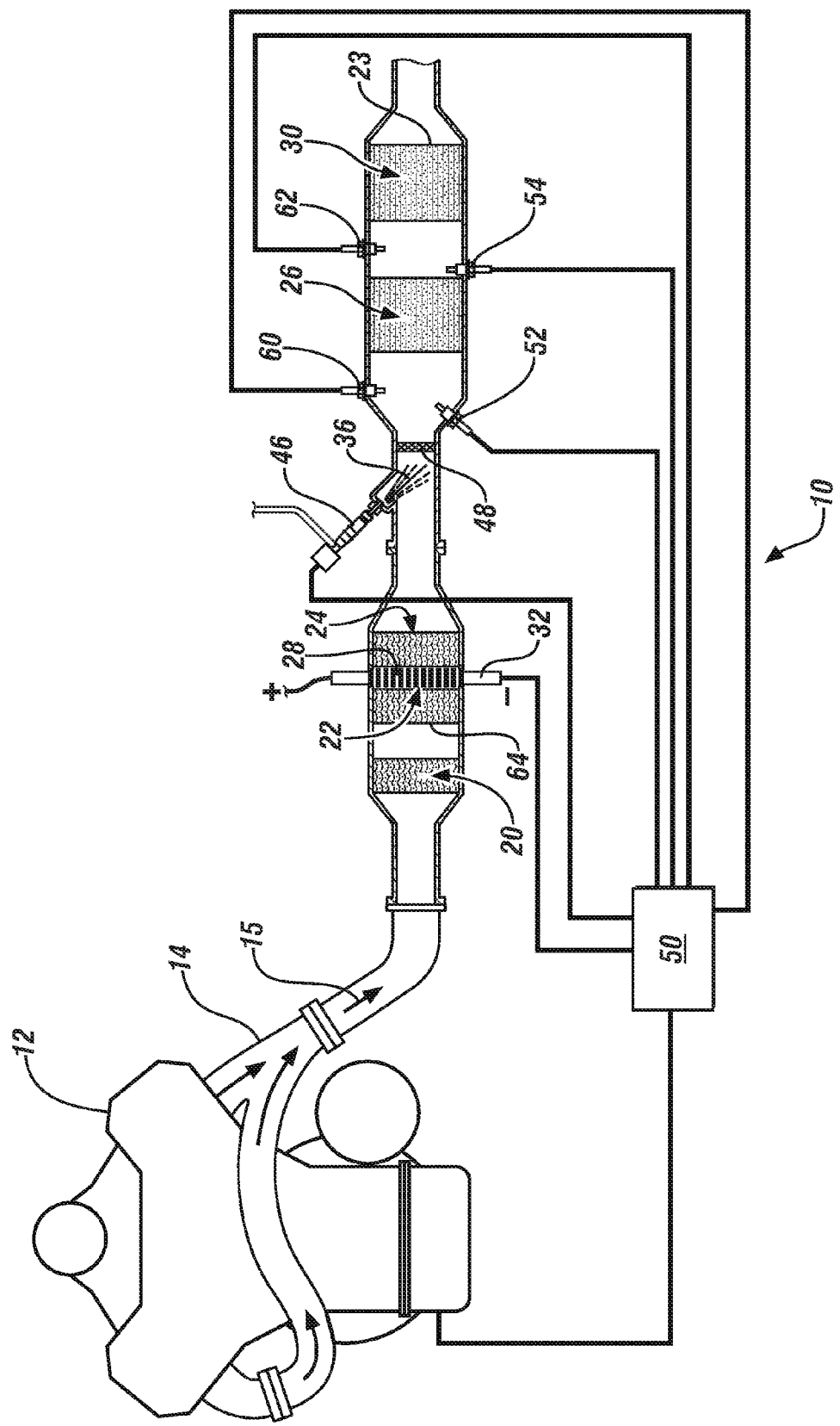
FIG. 1 is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include a hydrocarbon adsorber 20, an electrically heated catalyst ("EHC") device 22, an oxidation catalyst device ("OC") 24, a selective catalytic reduction device ("SCR") 26, and a particulate filter device ("PF") 30. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The hydrocarbon adsorber 20 includes for example, a flow-through metal or ceramic monolith substrate. The substrate can include a hydrocarbon adsorber compound disposed thereon. The hydrocarbon adsorber compound may be applied as a wash coat and may contain materials such as, for example, zeolite. The hydrocarbon adsorber 20 is located upstream of the EHC device 22, the OC device 24, and the SCR device 26. The hydrocarbon adsorber 20 is configured for reducing the emissions of HC during an engine cold start condition when the EHC device 22, the OC device 24 and the SCR device 26 have not heated to the respective light-off temperatures and are not active, by acting as a mechanism for storing fuel. Specifically, the zeolite-based material is used to store fuel or hydrocarbons during a cold start.

The OC device 24 is located downstream of the hydrocarbon adsorber 20 and may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain metals such as platinum ("Pt"), palladium ("Pd"), perovskite or other suitable oxidizing catalysts, or combination thereof. The OC device 24 treats unburned gaseous and non-volatile HC and CO, which are oxidized to create carbon dioxide and water.

In the embodiment as illustrated, the EHC device 22 is disposed within the OC device 24. The EHC device 22 includes a monolith 28 and an electrical heater 32, where the electrical heater 32 is selectively activated and heats the monolith 28. The electrical heater 32 is connected to an electrical source (not shown) that provides power thereto. In one embodiment, the electrical heater 32 operates at a voltage of about 12-24 volts and at a power range of about 1-3 kilowatts, however it is understood that other operating conditions may be used as well. The EHC device 22 may be constructed of any suitable material that is electrically conductive such as a wound or stacked metal monolith 28. An oxidation catalyst compound (not shown) may be applied to the EHC device 22 as a wash coat and may contain metals such as Pt, Pd, perovskite or other suitable oxidizing catalysts, or combination thereof.

The SCR device 26 may be disposed downstream of the OC device 24. In a manner similar to the OC device 24, the SCR device 26 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

In the example as shown in FIG. 1, an ammonia reductant 36 may be supplied from a reductant supply source (not shown) and may be injected into the exhaust gas conduit 14 at a location upstream of the SCR device 26 using an injector 46, or other suitable method of delivery of the reductant to the exhaust gas 15. The reductant 36 may be in the form of a gas, a liquid, or an aqueous urea solution and may be mixed with air in the injector 46 to aid in the dispersion of the injected spray. A mixer or turbulator 48 may also be disposed within the exhaust conduit 14 in close proximity to the injector 46 to further assist in thorough mixing of the reductant 36 with the exhaust gas 15. Alternatively, a passive ammonia system may be used as well, where a three-way catalyst (not shown) is placed upstream of the SCR device 26, and rich engine operation generates ammonia on the three-way catalyst.

The PF device 30 may be disposed downstream of the SCR device 26. The PF device 30 operates to filter the exhaust gas 15 of carbon and other particulates. In various embodiments, the PF device 30 may be constructed using a ceramic wall flow monolith filter 23 that may be packaged in a shell or canister constructed of, for example, stainless steel, and that has an inlet and an outlet in fluid communication with exhaust gas conduit 14. The ceramic wall flow monolith filter 23 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF device 30 may include other filter devices such as wound or packed fiber filters, open cell foams, sintered metal fibers, etc.

A control module 50 is operably connected to and monitors the engine 12 and the exhaust gas treatment system 10 through a number of sensors. The control module 50 is also operably connected to the electrical heater 32 of the EHC device 22, the engine 12 and the reductant injector 46. FIG. 1 illustrates the control module 50 in communication with two temperature sensors 52 and 54 located in the exhaust gas conduit 14. The first temperature sensor 52 is situated upstream of the SCR device 26, and the second temperature sensor 54 is located downstream of the SCR device 26. The temperature sensors 52 and 54 send electrical signals to the control module 50 that each indicate the temperature in the exhaust gas conduit 14 in specific locations. The control module 50 is also in communication with two $NO_x$ sensors 60 and 62 that are in fluid communication with the exhaust gas conduit 14. Specifically, the first $NO_x$ sensor 60 is located downstream of the internal combustion engine 12 and upstream of the SCR device 26 to detect a $NO_x$ concentration level. The second $NO_x$ sensor 62 is located downstream of the SCR device 26 to detect the $NO_x$ concentration level in the exhaust gas conduit 14 in specific locations.

The control module 50 includes control logic for monitoring the first temperature sensor 52 and the second temperature sensor 54 and for calculating a temperature profile of the SCR device 26. Specifically, the first temperature sensor 52 and the second temperature sensor 54 are averaged together to create the temperature profile of the SCR device 26. The control module 50 also includes control logic for selectively activating or deactivating the EHC device 22 based on the temperature profile of the SCR device 26. Specifically, if the temperature profile of the SCR device 26 is above a light-off or minimum operating temperature, then the electrical heater 32 is deactivated, and no longer heats the EHC device 22. However, as long as the temperature profile of the SCR device 22 is below the light-off temperature the electrical heater 32 is activated or remains activated, and heat is provided to the SCR device 26.

The control module 50 also includes control logic for monitoring the temperature of the EHC device 22. Specifically, the control module 50 may monitor the temperature of the EHC device 22 by several different approaches. In one approach, a temperature sensor (not shown) is placed downstream of the EHC device 22 and is in communication with the control module 50 for detecting the temperature of the EHC device 22. In an alternative approach, the temperature sensor is omitted, and instead the control module 50 includes control logic for determining the temperature of the EHC device 22 based on operating parameters of the exhaust gas system 10. Specifically, the temperature of the EHC device 22 may be calculated based on the exhaust flow of the engine 12, an input gas temperature of the engine 12, and the electrical power provided to the electrical heater 32. The exhaust flow of the engine 12 is calculated by adding the intake air mass of the engine 12 and the fuel mass of the engine 12, where the intake air mass is measured using an intake air mass flow sensor (not shown) of the engine 12, which measures air mass flow entering the engine 12. The fuel mass flow is measured by summing the total amount of fuel injected into the engine 12 over a given period of time. The fuel mass flow is added to the air mass flow rate to calculate the exhaust flow of the engine 12.

The control module 50 includes control logic for determining if the temperature of the EHC device 22 is above a threshold or EHC light-off temperature. In one exemplary embodiment, the EHC light-off temperature is about 250° C. If the temperature of the EHC device 22 is above the EHC light-off temperature, then the control module 50 includes control logic for de-energizing an electrical source (not shown) of the electrical heater 32.

The control module 50 includes control logic for determining an amount of $NO_x$ in the exhaust gas 15 reduced by the SCR device 26. The amount of $NO_x$ in the exhaust gas 15 reduced by the SCR device 26 may be calculated based on the output of the first $NO_x$ sensor 60, the second $NO_x$ sensor 62, and the SCR temperature profile temperature based on the first and second temperature sensors 52 and 54. The control module 50 includes control logic for determining if the amount of $NO_x$ in the exhaust gas 15 reduced by the SCR device 26 is above a threshold $NO_x$ value. In one embodiment, the threshold $NO_x$ value represents the maximum amount of $NO_x$ the SCR device 26 is capable of reducing after reaching the light-off temperature. The threshold $NO_x$ value is stored in the memory of the control module 50. In the event that the control module 50 determines that the amount of $NO_x$ in the exhaust gas reduced by the SCR device 26 is not above the threshold $NO_x$ value, the control module 50 includes control logic for activating the reductant injector 46 to dose the reductant 36 to the SCR device 26.

The control module 50 also includes control logic for determining if the SCR device 26 has a threshold value of reductant 36 stored therein. In one embodiment, the threshold value of reductant 36 represents the amount of reductant 36 needed to create a chemical reaction to convert the reductant and the oxides of nitrogen $NO_x$ in the exhaust gas into an intermediate such as, for example, ammonium nitrate ("$NH_4NO_3$") or ammonium nitrite ("$NH_4NO_2$") within the SCR device 26. In yet another embodiment, the threshold value of reductant 36 represents the reductant 36 that is stored by the SCR device 26 at a saturation point. The saturation point represents a maximum amount of reductant 36 the SCR device 26 is capable of storing. Specifically, the memory of the control module 50 stores a value that indicates the maximum amount of reductant 36 that can be stored within the SCR device 26. The control module 50 also includes control logic for activating the reductant injector 46 if the SCR device 26 has not stored the threshold value of reductant 36. For example, in one embodiment the control module 50 also includes control logic 50 for activating the reductant injector 46 to load the SCR device 26 with reductant 36 before cold start of the engine 12. In one exemplary embodiment of the exhaust gas treatment system 10, the control module 50 includes control logic for activating the reductant injector 46 to load the SCR device 26 with reductant 36 to the saturation point of the SCR device 26.

The SCR device 26 is heated to the light-off temperature, which generally effectively reduces the amount of $NO_x$ in the exhaust gas 15. Specifically, the $NO_x$ in the exhaust gas 15 is reduced to nitrogen after light-off of the SCR device 26. As discussed above, in one embodiment the oxidation catalyst compound applied to the EHC device 22 and the OC device 24 may contain metals such as Pt, Pd, or perovskite. These types of oxidation catalysts may convert NO to $NO_2$ at a relatively high rate during cold start of an engine when compared to some other types of oxidation catalyst compounds that are currently available. The majority of $NO_x$ emitted from the engine is in the form of NO, however it should be noted that $NO_2$ is more easily adsorbed than NO by the SCR device 26. Thus, the conversion of NO to $NO_2$ at a relatively high rate may facilitate or improve the reduction of $NO_x$ in the exhaust gas 15 by the SCR device 26 once the SCR device 26 is heated to the light-off temperature.

The EHC device 22 is also positioned downstream of a front face 64 of the OC device 24 such that hydrocarbons in the exhaust gas 15 do not substantially interfere with the generation of NO to $NO_2$ by the EHC device 22. Specifically, the OC device 24 is employed in an effort to treat unburned gaseous and non-volatile HC and CO upstream of the EHC device 22. Hydrocarbons in the exhaust gas 15 may interfere with the conversion of NO to $NO_2$ by the EHC device 22. Thus, the placement of the OC device 24 upstream of the EHC device 22 facilitates reducing the amount of $NO_x$ in the exhaust gas 15 by reducing or substantially eliminating hydrocarbons that interfere with $NO_2$ generation. For example, in the one embodiment employing a perovskite oxidation catalyst compound, the conversion of NO to $NO_2$ is approximately 85% at 300° C. In yet another exemplary embodiment employing a Pt based catalyst compound, the conversion of NO to $NO_2$ is approximately 55% at 300° C., however it is understood that other examples of operation may be obtained as well.

Moreover, the hydrocarbon adsorber 20 is configured for reducing the amount of HC that reaches the EHC device 22 and the OC device 24 during a cold start, which also facilitates or improves the reduction of $NO_x$ in the exhaust gas 15. The hydrocarbon adsorber 20 acts as a mechanism for storing fuel or hydrocarbons during a cold start. That is, the hydrocarbons are adsorbed by the hydrocarbon adsorber 20 prior to reaching the EHC device 22 and the OC device 24. Thus, the hydrocarbon adsorber 20 may also facilitate reducing the amount of $NO_x$ in the exhaust gas 15 by reducing or substantially eliminating hydrocarbons that interfere with $NO_2$ generation.

Figure 2:
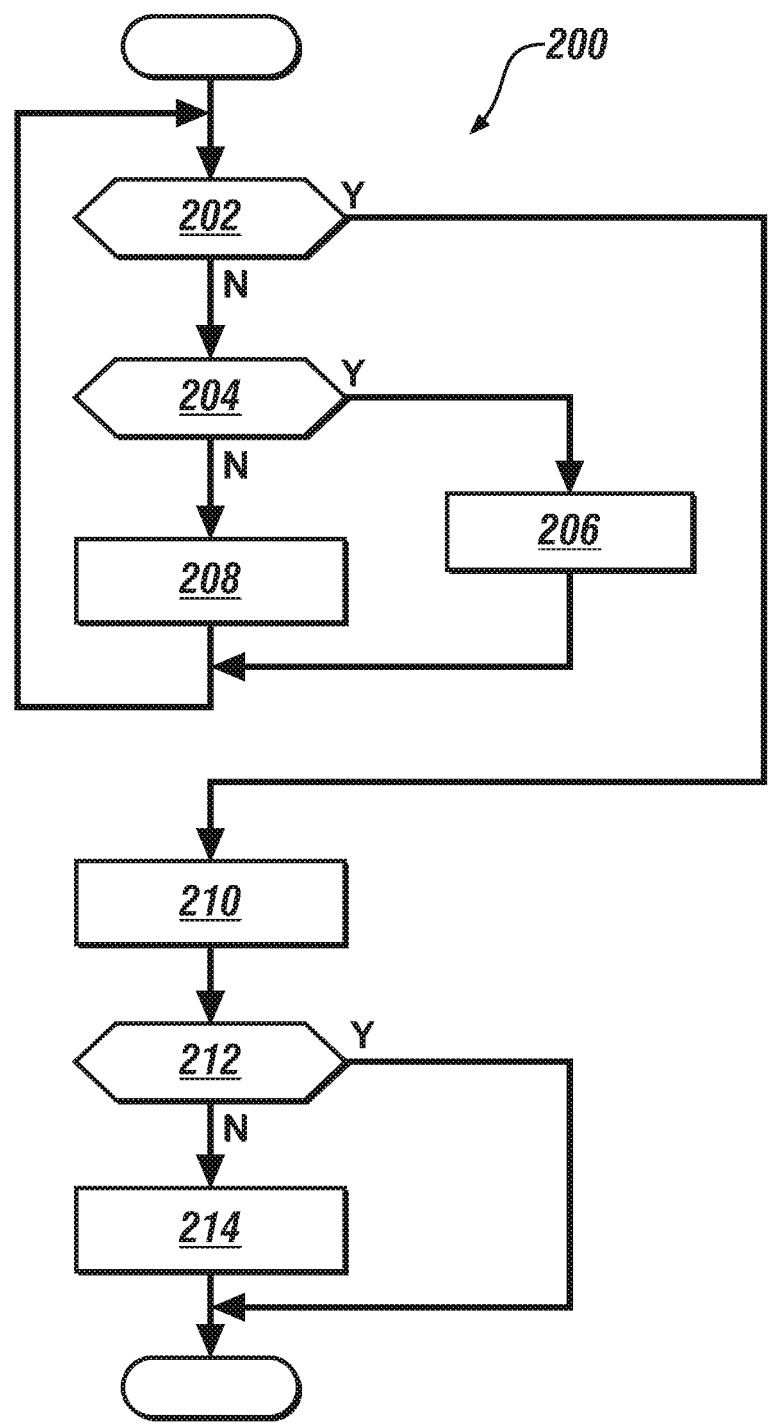
FIG. 2 is a process flow diagram illustrating a method of activating an electrically heated catalyst ("EHC") and a selective catalytic reduction device ("SCR") illustrated in FIG. 1.

A method of operating the exhaust gas treatment system 10 will now be explained. Referring to FIG. 2, an exemplary process flow diagram illustrating an exemplary process of operating the exhaust gas treatment system 10 is generally indicated by reference number 200. Process 200 begins at step 202, where a control module 50 includes control logic for monitoring a temperature profile of an SCR device 26 to determine if the SCR device 26 is above or below a respective light-off temperature. Specifically, referring to FIG. 1, the control module 50 is in communication with two temperature sensors 52 and 54 located in an exhaust gas conduit 14, where the first temperature sensor 52 is situated upstream of the SCR device 26, and the second temperature sensor 54 is located downstream of the SCR device 26. The control module 50 includes control logic for monitoring the first temperature sensor 52 and the second temperature sensor 54 and for calculating a temperature profile of the SCR device 26. Specifically, the first temperature sensor 52 and the second temperature sensor 54 are averaged together to create the temperature profile of the SCR device 26. In the event that the SCR device 26 is above the light-off temperature, process 200 may then proceed to step 210. If the SCR device 26 is below the respective light-off temperature, process 200 may then proceed to step 204.

In step 204, the control module 50 includes control logic for determining if an EHC device 22 is above the respective light-off temperature. As discussed above, the control module 50 may monitor the temperature of the EHC device 22 by several different approaches. In one approach, a temperature sensor (not shown in FIG. 1) is placed downstream of the EHC device 22 and is in communication with the control module 50 for detecting the temperature of the EHC device 22. In an alternative approach, the temperature sensor is omitted, and instead the control module 50 includes control logic for determining the temperature of the EHC device 22 based on operating parameters of an exhaust gas system 10. If the EHC device 22 is above the light-off temperature, process 200 proceeds to step 206, where an electrical heater 32 that heats a monolith 28 of the EHC device 22 is deactivated. If the EHC device 22 is below the light-off temperature, process 200 proceeds to step 208, where the where the electrical heater 32 is activated. Both steps 206 and 208 then return back to step 202, where process 200 repeats.

In the event that the SCR device 26 is above the light-off temperature in step 202, then process 200 proceeds to step 210. In step 210, the control module 50 includes control logic for deactivating the electrical heater 32 of the EHC device 22. Process 200 may then proceed to step 212.

In step 212, the control module 50 includes control logic for determining an amount of $NO_x$ in the exhaust gas 15 reduced by the SCR device 26. The amount of $NO_x$ in the exhaust gas 15 reduced by the SCR device 26 may be calculated based on the output of a first $NO_x$ sensor 60, a second $NO_x$ sensor 62, and the SCR temperature profile temperature based on the first and second temperature sensors 52, 54. The control module 50 includes control logic for determining if the amount of $NO_x$ in the exhaust gas 15 reduced by the SCR device 26 is above a threshold $NO_x$ value. In the event that the control module 50 determines that the amount of $NO_x$ in the exhaust gas reduced by the SCR device 26 is above the threshold $NO_x$ value, then process 200 may terminate. In the event that the control module 50 determines that the amount of $NO_x$ in the exhaust gas reduced by the SCR device 26 is below the threshold $NO_x$ value, then process 200 may then proceed to step 214.

In step 214, the control module 50 includes control logic for activating the reductant injector 46 to dose the reductant 36 to the SCR device 26. Specifically, in one exemplary embodiment of the exhaust gas treatment system 10, the control module 50 includes control logic for activating the reductant injector 46 to load the SCR device 26 with reductant 36 to the saturation point of the SCR device 26. The control module 50 may also include control logic 50 for activating the reductant injector 46 to load the SCR device 26 with reductant 36 before cold start of the engine 12. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
   an exhaust gas conduit in fluid communication with, and configured to receive an exhaust gas from the internal combustion engine, the exhaust gas containing oxides of nitrogen ("$NO_x$"), carbon monoxide and hydrocarbons;
   an oxidation catalyst ("OC") device in fluid communication with the exhaust gas conduit, the OC device having a front face, the OC device adsorbing hydrocarbons and selectively activated to induce oxidation of the hydrocarbons in the exhaust gas;
   an electrically heated catalyst ("EHC") device in fluid communication with the exhaust gas conduit and configured to receive the exhaust gas, wherein the EHC device is located within the OC device and is selectively activated to produce heat and induce further oxidation of the exhaust gas, the EHC device having an oxidation catalyst compound disposed thereon for converting nitrogen oxide ("NO") to nitrogen dioxide ("$NO_2$"), the EHC device being positioned downstream of the front face of the OC device such that hydrocarbons in the exhaust gas do not substantially interfere with the generation of $NO_2$ by the EHC device;
   a selective catalytic reduction ("SCR") device in fluid communication with the exhaust gas conduit and configured to receive the exhaust gas, the SCR device located downstream of the EHC device and the OC device, and wherein the SCR device is in communication with and receives and stores reductant from a reductant source;
   a control module in communication with the EHC device and the internal combustion engine, comprising:
      a control logic for determining if the SCR device has a threshold value of reductant stored therein, wherein the threshold value of reductant is the amount of reductant needed to create a chemical reaction to convert the reductant and the oxides of nitrogen $NO_x$ in the exhaust gas into intermediates; and
      a control logic for activating the reductant source if the SCR device has not stored the threshold value of reductant.

2. The exhaust gas treatment system of claim 1, wherein the control module includes a control logic for selectively activating the EHC depending on if the SCR device has achieved a light-off temperature.

3. The exhaust gas treatment system of claim 1, further comprising a hydrocarbon ("HC") adsorber in fluid communication with the exhaust gas conduit and located upstream of both the EHC device, the OC device, and the SCR device, wherein the HC adsorber adsorbs hydrocarbons from the exhaust gas.

4. The exhaust gas treatment system of claim 1, further comprising a first temperature sensor and a second temperature sensor in fluid communication with the exhaust gas conduit, the first temperature sensor situated upstream of the SCR device and the second temperature sensor situated downstream of the SCR device.

5. The exhaust gas treatment system of claim 4, wherein the control module includes control logic for monitoring the first temperature sensor and the second temperature sensor, and a control logic for calculating an SCR temperature profile based on signals from the first temperature sensor and the second temperature sensor.

6. The exhaust gas treatment system of claim 5, wherein the control module includes control logic for determining if the SCR temperature profile of the SCR device is below an SCR light-off temperature, a control logic for activating the EHC device to an EHC light-off temperature if the SCR temperature profile of the SCR device is below the SCR light-off temperature, and a control logic for deactivating the EHC device if the SCR temperature profile of the SCR device is above the SCR light-off temperature.

7. The exhaust gas treatment system of claim 1, further comprising a first $NO_x$ sensor and a second $NO_x$ sensor that are in fluid communication with the exhaust gas conduit, the first $NO_x$ sensor located downstream of the internal combustion engine and upstream of the SCR device and the second $NO_x$ sensor located downstream of the SCR device.

8. The exhaust gas treatment system of claim 7, wherein the control module includes a control logic for determining an amount of $NO_x$ in the exhaust gas reduced by the SCR, wherein the amount of $NO_x$ in the exhaust gas reduced by the SCR device is based on the output of the first $NO_x$ sensor, the second $NO_x$ sensor, and the SCR temperature profile temperature.

9. The exhaust gas treatment system of claim 8, wherein the control module includes control logic for determining if the amount of $NO_x$ in the exhaust gas reduced by the SCR device is above a threshold $NO_x$ value, wherein the threshold $NO_x$ value represents the maximum amount of $NO_x$ the SCR device reduces.

10. The exhaust gas treatment system of claim 9, wherein the control module includes control logic for activating the reductant injector to dose the reductant to the SCR device if the amount of $NO_x$ in the exhaust gas reduced by the SCR is not above the threshold $NO_x$ value.

11. The exhaust gas treatment system of claim 1, wherein the OC device has an oxidation catalyst compound disposed thereon that is one of Palladium ("Pd"), Platinum ("Pt"), and perovskite.

12. The exhaust gas treatment system of claim 1, wherein the oxidation catalyst compound disposed on the EHC is one of Palladium ("Pd"), Platinum ("Pt"), and perovskite.

13. The exhaust gas treatment system of claim 1, wherein the control module includes control logic for determining the temperature of the EHC device.

14. The exhaust gas treatment system of claim 13, wherein the control module includes control logic for determining the temperature of the EHC device based on an exhaust flow of the engine, an input gas temperature of the engine, and an electrical power provided to an electrical heater of the EHC device.

15. The exhaust gas treatment system of claim 13, wherein the control module includes control logic for determining the temperature of the EHC temperature based on operating parameters of the exhaust gas system.

16. The exhaust gas treatment system of claim 1, wherein the threshold value of reductant stored by the SCR device is a saturation point representing a maximum amount of reductant that the SCR device stores.

17. An exhaust gas treatment system for an internal combustion engine, comprising:
  an exhaust gas conduit in fluid communication with, and configured to receive an exhaust gas from the internal combustion engine, the exhaust gas containing oxides of nitrogen ("$NO_x$"), carbon monoxide and hydrocarbons;
  an oxidation catalyst ("OC") device in fluid communication with the exhaust gas conduit, the OC device having a front face, the OC device adsorbing hydrocarbons and is selectively activated to induce oxidation of the hydrocarbons in the exhaust gas;
  an electrically heated catalyst ("EHC") device in fluid communication with the exhaust gas conduit and configured to receive the exhaust gas, wherein the EHC device is located within the OC device and is selectively activated to produce heat and induce further oxidation of the exhaust gas, the EHC device having an oxidation catalyst compound disposed thereon for converting nitrogen oxide ("NO") to nitrogen dioxide ("$NO_2$"), the EHC device being positioned downstream of the front face of the OC device such that hydrocarbons in the exhaust gas do not substantially interfere with the generation of $NO_2$ by the EHC device, the EHC device being selectively activated to an EHC light-off temperature;
  an selective catalytic reduction ("SCR") device in fluid communication with the exhaust gas conduit and configured to receive the exhaust gas, the SCR device located downstream of the EHC device and the OC device, and wherein the SCR device is in communication with and receives and stores reductant from a reductant source, the SCR device being selectively activated to an SCR light-off temperature;
  a first temperature sensor and a second temperature sensor in fluid communication with the exhaust gas conduit, the first temperature sensor situated upstream of the SCR device and the second temperature sensor situated downstream of the SCR device;
  a hydrocarbon ("HC") adsorber in fluid communication with the exhaust gas conduit and located upstream of both the EHC device, the OC device, and the SCR device, wherein the HC adsorber adsorbs hydrocarbons from the exhaust gas;
  a control module in communication with the EHC device and the internal combustion engine, comprising:
    a control logic for determining if the SCR device has a threshold value of reductant stored therein, wherein the threshold value of reductant is the amount of reductant needed to create a chemical reaction to convert the reductant and the oxides of nitrogen $NO_x$ in the exhaust gas into intermediates;
    a control logic for activating the reductant source if the SCR device has not stored the threshold value of reductant;

a control logic for selectively activating the EHC depending on if the SCR device has achieved the SCR light-off temperature;

a control logic for monitoring the first temperature sensor and the second temperature sensor;

a control logic for calculating an SCR temperature profile based on signals from the first temperature sensor and the second temperature sensor;

a control logic for determining if the SCR temperature profile of the SCR device is below the SCR light-off temperature;

a control logic for activating the EHC device to the EHC light-off temperature if the SCR temperature profile of the SCR device is below the light-off temperature; and a control logic for deactivating the EHC device if the SCR temperature profile of the SCR device is above the SCR light-off temperature.

18. The exhaust gas treatment system of claim 17, further comprising a first $NO_x$ sensor and a second $NO_x$ sensor that are in fluid communication with the exhaust gas conduit, the first $NO_x$ sensor located downstream of the internal combustion engine and upstream of the SCR device and the second $NO_x$ sensor located downstream of the SCR device.

19. The exhaust gas treatment system of claim 18, wherein the control module includes a control logic for determining an amount of $NO_x$ in the exhaust gas reduced by the SCR, wherein the amount of $NO_x$ in the exhaust gas reduced by the SCR device is based on the output of the first $NO_x$ sensor, the second $NO_x$ sensor, and the SCR temperature profile temperature.

20. The exhaust gas treatment system of claim 19, wherein the control module includes control logic for determining if the amount of $NO_x$ in the exhaust gas reduced by the SCR device is above a threshold $NO_x$ value, wherein the threshold $NO_x$ value represents the maximum amount of $NO_x$ the SCR device reduces.

* * * * *